J. G. ROTH,

Assignor to METROPOLITAN MANUFACTURING CO.

Wringing-Machine.

No. 9,158. Reissued April 13, 1880.

Witnesses:

P. C. Dieterich,

Wm. C. Uppermann.

Inventor:

John G. Roth.

Per C. A. Watson & Co., Attorneys.

UNITED STATES PATENT OFFICE.

JOHN G. ROTH, OF NEW YORK, N. Y., ASSIGNOR TO METROPOLITAN MANUFACTURING COMPANY, OF MIDDLEFIELD, CONNECTICUT.

WRINGING-MACHINE.

SPECIFICATION forming part of Reissued Letters Patent No. 9,158, dated April 13, 1880.

Original No. 122,659, dated January 9, 1872. Application for reissue filed March 6, 1880.

*To all whom it may concern:*

Be it known that I, JOHN G. ROTH, of New York, in the county of New York and State of New York, have invented certain new and useful Improvements in Wringing-Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The object of my invention is to provide means for discharging the water squeezed from the clothes passing through the wringer-rolls from one to the other side of the machine, according to the position of the tub or other vessel for the reception of the water, and thus to prevent the water from accidentally escaping and falling on the floor.

My invention consists in the employment, in the frame of the wringer below the rolls, of two downwardly-inclined converging dripping-boards, or their equivalents, and a movable guide or partition so arranged that it may be shifted to one or the other side of the space below the rolls, for the purpose of directing the water falling from the rolls to one or the other side of the machine, as desired.

The manner in which my invention is or may be carried into effect can readily be explained and understood by reference to the accompanying drawings, in which—

Figure 1:
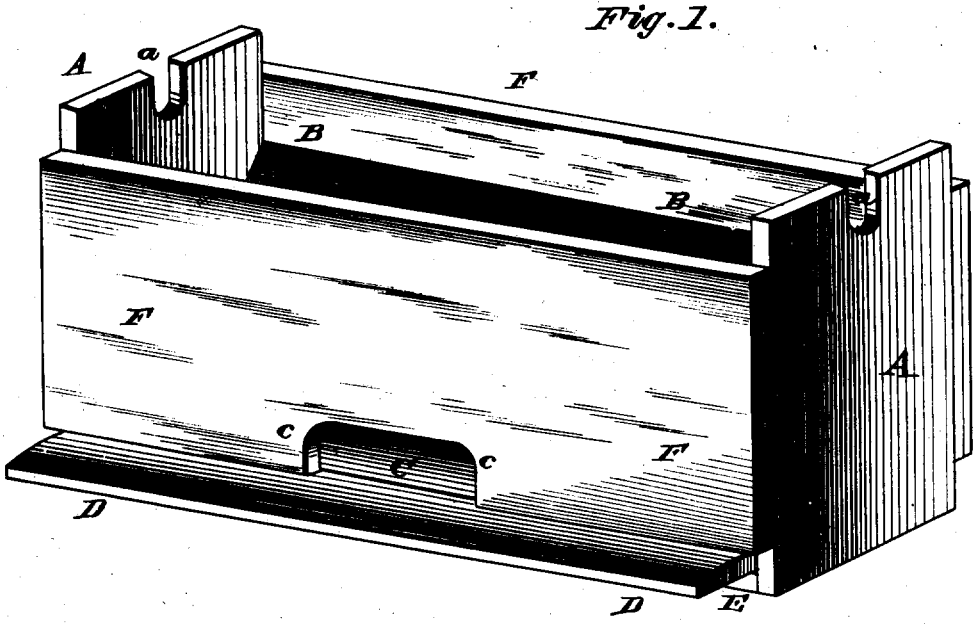
Figure 2:
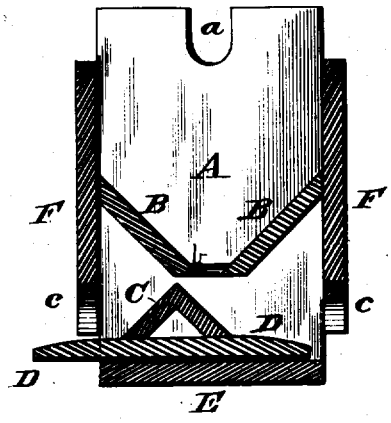

Figure 1 is a perspective view of so much of the lower portion of the frame of a wringer as is necessary to illustrate my invention. Fig. 2 is a transverse vertical section of the same.

A represents the wringer-frame, and *a* the bearings in which the shaft of the lower roll is supported. At a suitable distance below the lower roll I arrange two downwardly-inclined converging dripping-boards, B B, which are secured firmly to the wringer-frame, and are so arranged as to have between their lower ends a central space or opening, *b*, through which the water falling upon either or both dripping-boards will pass. I thus concentrate the flow of water at one point, and in order to effect the discharge of this from one or the other side of the machine at pleasure I arrange below the said opening a movable guide or water-shed, which can be shifted so as to cause the water to pass from either side of the machine. The device, in the present instance, consists of a double-inclined shed, C, secured to the bottom board or plate, D, which rests loosely upon a support, E, or is otherwise arranged in the frame, so that it may slide back and forth in order to shift the position of the shed C to either side of the opening *b*. The board D projects some distance beyond the frame of the wringer for the purpose of allowing it to be easily adjusted. For instance, when the shed is in the position shown in Fig. 2 the board will project some distance on the left of the machine. If it be desired to shift the position of the shed, the projecting part of the board is pushed in, and in its sliding movement will carry the water-shed over to the other side of the opening *b*, thus changing the direction of the flow of water.

In lieu, however, of having the board to thus project bodily beyond the wringer-frame, projecting knobs, pins, or handles may be substituted, by means of which the adjustment of the sliding water-shed can be effected.

In lieu of the double-inclined sliding shed, a simple upright partition-board mounted on the sliding support D may be used; but I prefer the arrangement first mentioned.

With the devices above described I prefer to use on each side of the machine a shield, F, with a central perforation or opening, *c*, for the purpose of discharging the water at a point where the wringer most overhangs the tub or other vessel provided to receive the water.

When the wringer is in use, no matter in which direction the rolls revolve, the water from them will be caught by the converging drip-boards B, and will be directed to the central opening, *b*. By shifting the position of the shed C to one side or the other of this opening the water will be guided toward and caused to escape from either side of the wringer, as preferred.

Having thus fully described my invention, what I claim as new, and desire to secure by Letters Patent, is—

1. The combination, with the frame of a wringer, of a sliding water-guide or partition for the purpose of turning the water to either side, substantially as set forth.

2. The combination, with the frame of a wringer, of the support E, the slide D, and guide or partition C, for the purpose set forth.

3. The downwardly-inclined converging stationary dripping-boards arranged in the frame of the wringer, with a space or opening for the passage of water between their lower ends, in combination with an adjustable or movable shed arranged beneath said opening to deflect or guide the water passing therefrom to either side of the machine at pleasure, substantially as specified.

4. The combination, with the wringer-frame and downwardly-inclined converging dripping-boards, of the sliding water-shed, arranged beneath the central opening between said boards, so as to be shifted from one side to the other of the same, substantially as shown and described.

In testimony that I claim the foregoing I have hereunto set my hand this 19th day of February, 1880.

JOHN G. ROTH.

Witnesses:
J. W. HINESLEY,
J. P. JACKSON.